(12) United States Patent
Ma et al.

(10) Patent No.: US 7,092,436 B2
(45) Date of Patent: Aug. 15, 2006

(54) EXPECTATION-MAXIMIZATION-BASED CHANNEL ESTIMATION AND SIGNAL DETECTION FOR WIRELESS COMMUNICATIONS SYSTEMS

(75) Inventors: Xiaoqiang Ma, Princeton, NJ (US); Hisashi Kobayashi, Princeton, NJ (US); Stuart C. Schwartz, Princeton, NJ (US); Daqing Gu, Morris Plains, NJ (US); Jinyun Zhang, New Providence, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 840 days.

(21) Appl. No.: 10/057,179

(22) Filed: Jan. 25, 2002

(65) Prior Publication Data

US 2003/0147476 A1 Aug. 7, 2003

(51) Int. Cl.
*H03H 7/30* (2006.01)
*H03H 7/40* (2006.01)

(52) U.S. Cl. .................. 375/229; 375/230; 375/232

(58) Field of Classification Search ........ 375/229–236, 375/316, 346, 348
See application file for complete search history.

(56) References Cited

U.S. PATENT DOCUMENTS

| | | | | |
|---|---|---|---|---|
| 5,509,020 A | * | 4/1996 | Iwakiri et al. | 714/704 |
| 6,377,607 B1 | * | 4/2002 | Ling et al. | 375/130 |
| 6,459,728 B1 | * | 10/2002 | Bar-David et al. | 375/231 |
| 6,614,857 B1 | * | 9/2003 | Buehrer et al. | 375/340 |
| 6,768,713 B1 | * | 7/2004 | Siala et al. | 370/203 |
| 2001/0004390 A1 | * | 6/2001 | Pukkila et al. | 375/340 |
| 2002/0150037 A1 | * | 10/2002 | Bao et al. | 370/208 |

\* cited by examiner

*Primary Examiner*—Chieh M. Fan
*Assistant Examiner*—Jason M. Perilla
(74) *Attorney, Agent, or Firm*—Dirk Brinkman; Andrew J. Curtin

(57) ABSTRACT

A system and method detect symbols of a modulated signal received via a plurality of channels of a wireless communications system. A symbol transmitted via the channels is initially estimated based on the channel estimate from either pilot symbol or previously estimated symbol, and then channel estimate is updated. The next estimate of the symbol is computed by using updated channel information and maximizing the expectation of the log likelihood function. The next estimate is then quantized according to the signal constellation. The quantized estimate of the symbol is compared with the previous estimate of the symbol to determine if the previous estimate of the symbol and the quantized next estimate of the symbol have converged. Otherwise, the quantized next estimate of the symbol is made as the input for the next iteration, and the updating, optimizing, quantizing, and comparing are repeated until the estimate converges.

16 Claims, 7 Drawing Sheets

EXPECTATION-MAXIMIZATION-BASED CHANNEL ESTIMATION AND SIGNAL DETECTION FOR WIRELESS COMMUNICATIONS SYSTEMS

FIELD OF THE INVENTION

The invention relates generally to communications systems, and more particularly to channel estimation and signal detection in wireless communications systems.

BACKGROUND OF THE INVENTION

Orthogonal frequency division multiplexing (OFDM) is a signal modulation technique in which a transmitter divides a signal, and then transmits the divided signal over several subcarriers. The subcarriers are located on a frequency axis at regular intervals. With the OFDM technique, in contrast with conventional serial communication techniques, the transmitted signal is divided into N streams, and the N stream are then transmitted in parallel over N subcarriers, each having a separate carrier frequency. The OFDM technique transmits the signal reliably and efficiently at a high data rate.

The subcarriers are made "orthogonal" by appropriately selecting the spacing of the frequencies in the frequency band. Therefore, spectral overlapping among subcarriers is allowed because the orthogonality ensures that the receiver can separate the OFDM subcarriers. With OFDM, a better spectral efficiency is achieved than by using a simple frequency division multiplexing technique. OFDM is more robust to data loss due to multipath fading when compared with a single carrier because OFDM has an increased symbol period for the same aggregate data rate.

In addition, inter-symbol interference (ISI) in OFDM transmissions can be prevented by inserting a guard interval before each transmitted block of symbols. Moreover, OFDM is robust to frequency selective fading because each subchannel occupies a relatively narrow frequency band, where the characteristic of the channel frequency is relatively flat. Thus, OFDM is used by many communication systems, including digital audio and video broadcasting (DAB, DVB), and high-speed digital subscriber line (DSL) modems over a twisted pair of wires. OFDM can also be used in wireless local area networks (WLANs), and fixed broadband wireless communication networks.

However, it is not possible to make reliable data decisions in OFDM systems unless a good channel estimate is available. Thus, an efficient and accurate channel estimation method is necessary to coherently demodulate received data. Although differential detection could be used to detect the transmitted signals in the absence of channel information, this would result in about a 3 dB loss in SNR compared to coherent detection.

A number of channel estimation techniques are known in the prior art. In most of those, the channel estimates are continuously updated by transmitting pilot symbols using specified time-frequency lattices. One class of such pilot assisted estimation processes adopt an interpolation technique with fixed one or two-dimensional parameters to estimate the frequency domain channel impulse response (CIR). Channel estimates are obtained at lattices assigned to the pilot tones, see Jae Kyoung Moon and Song In Choi, "Performance of channel estimation methods for OFDM systems in multipath fading channels," *IEEE Transactions on Consumer Electronics*, Vol. 46, No. 1, February 2000, pp. 161–170, P. Hoeher, S. Kaiser, and P. Robertson, "Two-dimensional pilot-symbol-sided channel estimation by Wiener filtering," *Proceedings of 1997 IEEE International Conference on Acoustics, Speech and Signal Processing, ICASSP-97*, vol. 3, pp. 1845–1848, and F. Said and A. H. Aghvami, "Linear two dimensional pilot assisted channel estimation for OFDM systems," $6^{th}$ *IEEE Conference on Telecommunications*, 1998, pp. 32–36. Linear, spline and Gaussian filters can all be used with these methods.

Another class of methods adopt known channel statistics and channel estimates at pilot symbols to estimate the CIR in the sense of minimum mean square error (MMSE), see Ye Li, Leonard J. Cimini, Jr., and Nelson R. Sollenberger, "Robust channel estimation for OFDM systems with rapid dispersive fading channels," *IEEE Transactions on Communication*, Vol. 46, No. 7, July 1998, pp. 902–915, J.-J. van de Beek, O. Edfors, M. Sandell, S. K. Wilson, and P. O. Borjesson, "On channel estimation in OFDM systems," *IEEE Vehicular Technology Conference*, 1995, Vol. 2, pp. 815–819, and O. Edfors, M. Sandell, S. K. Wilson, J.-J. van de Beek, and P. O. Borjesson, "OFDM channel estimation by singular value decomposition," *IEEE Transactions on Communications*, Vol. 46 No. 7, July 1998, pp. 931–939. Shortcomings of those processes include a large error floor that may be incurred by a mismatch between the estimated and real CIRs, and difficulty in obtaining the correlation function of the channel impulse response.

Therefore, there is a need for an efficient method for estimating channels so that received symbols can be coherently detected and demodulated.

SUMMARY OF THE INVENTION

The invention provides an expectation-maximization (EM) based system and method for efficiently estimating channel states and for coherently detecting received symbols via channels of a wireless communications system. A maximum likelihood estimate of the channel impulse response (CIR) is obtained by using the EM-based method to estimate the channel mean and covariance, i.e., the channel statistics. The invention improves signal detection, and the accuracy of the channel estimate by making use of the iterative EM process.

More particularly the system and method detects symbols of a modulated signal received via a plurality of channels of a wireless communications system. The method updates the channel estimate and detects the received symbol iteratively until the estimates converge. The estimate of the symbol is first determined by maximizing the expectation of the log likelihood function, and then quantized according to the signal constellation.

The quantized estimate of the symbol is compared with the previous estimate of the symbol to determine if the estimates have converged. Otherwise, the quantized estimate is made as the input for the next iteration, and the estimating, maximizing, quantizing, and comparing are repeated until the estimates converge.

DETAILED DESCRIPTION OF THE PREFERRED EMBODIMENT

Expectation-Maximization

Our invention uses an expectation-maximization (EM) method to estimate statistical characteristics (parameters) of a wireless communications channel, and to detect signals in the estimated channel.

The EM method according to the invention includes two iterative steps: an expectation step and a maximization step. The expectation step is performed with respect to unknown underlying channel parameters, using a previous estimate of the parameters, conditioned upon incomplete observations. The maximization step then provides an improved estimate that maximizes the expectation of a log likelihood function defined over complete data, conditioned on the previous estimate and the next estimate. These two steps are iterated until the estimated values converge. See A. P. Dempster, N. M. Laird and D. B. Rubin, "Maximun likelihood estimation from incomplete data," *Journal of the Royal Statistical Society (B)*, Vol. 39, No. 1, 1977, pp. 1–38, and T. K. Moon, "The expectation-maximization algorithm," *IEEE Signal Processing Magazine*, Vol. 13 No. 6, November 1996, pp. 47–60 for a general description of EM-based methods.

We use EM to estimate channel states and to recover transmitted symbols of an OFDM system over a frequency selective channel with additive white Gaussian noise (AWGN). After each iteration, we obtain a more accurate channel estimate for detecting transmitted symbols.

OFDM System Structure

Transmitter

Figure 1:
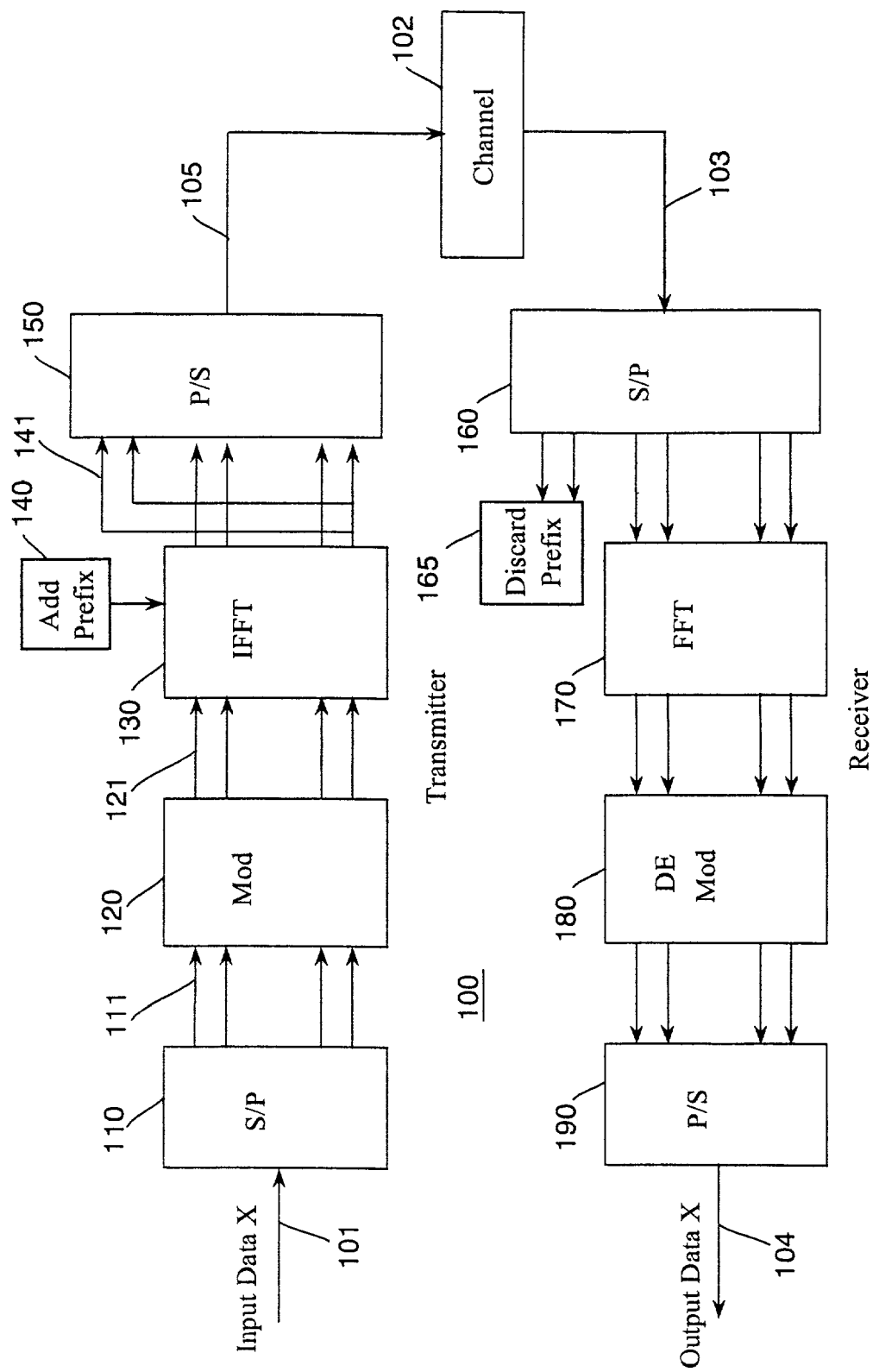
FIG. 1 is a block diagram of a wireless communications system according to the invention.

FIG. 1 shows a baseband equivalent representation of an OFDM system 100 that uses the invention. In a transmitter of the OFDM system 100, input binary data symbols X 101 are fed into a serial to parallel (S/P) converter 110 to produce parallel data streams. Each parallel data stream 111 is then modulated (Mod) 120 to corresponding sub-carriers 121 using, for example, MPSK or MQAM modulation techniques. Modulation schemes can vary on the sub-carriers in order to achieve a maximum capacity or a minimum bit error rate (BER) under some constraints. We describe the invention in terms of fixed modulation, e.g., QPSK or 16QAM, on all of the sub-carriers 121. However, it should be understood that the invention could be applied to any modulation scheme.

The modulated symbols, represented by complex variables X(0), . . . , X(M−1), are transformed by an inverse fast Fourier transform (IFFT) 130. The transformed symbols are denoted as x(0), . . . , x(M−1). In order to avoid inter-symbol interference (ISI), a cyclic prefix (CP) is added 140 in front of each symbol. The CP replicates the end part of the previous IFFT output symbol. The length of the CP is longer than the channel length L. The parallel data are converted (P/S) 150 to a serial data stream 105, which is transmitted over a frequency selective fading channel 102.

Receiver

In a receiver of the system 100, received symbols y(0), . . . , y(M−1) 103 corrupted by multipath fading and AWGN, are converted (S/P) 160 to a form Y(0), . . . ,Y(M−1), after the cyclic prefix is discarded 165. A fast Fourier transform (FFT) 170 is applied and the signal is demodulated 180 and converted 190 to serial form as output symbols X 104 that correspond to the input symbols 101.

Channel Model

In our channel model, the variables $\underline{H}$, $\underline{h}$, $\underline{X}$, $\underline{Y}$, $\underline{N}$ denote the vectors of frequency-domain CIR, time-domain CIR, transmitted symbol, received symbol and white Gaussian noise, respectively. Our multipath time-invariant fading channel 102 is described by $$y(k) = \sum_{l=0}^{L-1} h_l x(k-l) + n(k), \; 0 \leq k \leq M-1, \quad (1)$$

where the time-domain CIR, $h_l$'s ($0 \leq l \leq L-1$) are independent complex-valued Rayleigh fading random variables, and n(k)'s ($0 \leq k \leq M-1$) are independent complex-valued Gaussian random variables with a zero mean and a variance $\sigma^2$ for both real and imaginary components. The variable L is the length of the time-domain CIR.

With the added CP in each OFDM symbol, there is no ISI. We consider only one OFDM symbol with M sub-carriers in analyzing the model of our system. After discarding the cyclic prefix and performing the FFT 170 at the receiver, we obtain the received symbol in the frequency domain as:

$$Y(m) = \frac{1}{\sqrt{M}} \sum_{k=0}^{M-1} y(k) e^{-j2\pi \frac{km}{M}}. \quad (2)$$

Substituting (1) into (2), we have $$Y(m) = X(m)H(m) + N(m), \; 0 \leq m \leq M-1, \quad (3)$$

where H(m) is the frequency response of the channel 102 at a sub-carrier m, which can be expressed as $$H(m) = \sum_{l=0}^{L-1} h_l e^{-j2\pi \frac{ml}{M}}, \; 0 \leq m \leq M-1. \quad (4)$$

A set of the transformed noise variables {N(m), $0 \leq m \leq M-1$}, which can be written as $$N(m) = \frac{1}{\sqrt{M}} \sum_{k=0}^{M-1} n(k) e^{-j2\pi \frac{km}{M}}, \; 0 \leq m \leq M-1, \quad (5)$$

are i.i.d. complex-valued Gaussian variables that have the same distribution as {n(k)}, i.e., with zero mean and variance $\sigma^2$. Note that inter-carrier interference (ICI) is eliminated at the output of the FFT 170 because of the orthogonality between the sub-carriers.

EM-Based Channel Estimation and Signal Detection Method

Our objective is to detect the transmitted symbol $X(m)$, $0 \leq m \leq M-1$ 105 from the received or observed symbol $Y(m)$, $0 \leq m \leq M-1$ 103. In order to reduce the bit error rate caused by uncertainty in the channel 102, we apply our EM-based method to take an average over the unknown CIR, assuming that the probability density function (pdf) of the CIR response is known at the receiver.

As previously stated, each transmitted symbol $X(m)$ 101 is modulated, for example, by QPSK or 16QAM. We use the notations $*$, $^T$ and $^H$ to denote the complex conjugate, transpose and complex conjugate transpose (Hermite), respectively, in our analysis.

Thus, we have $\underline{h}=[h_1, \ldots, h_L]^T$, $\underline{X}=[X(0), \ldots, X(M-1)]^T$, $\underline{Y}=[Y(0), \ldots, Y(M-1)]^T$, $\underline{N}=[N(0), \ldots, N(M-1)]^T$, $\underline{H}=W\underline{h}$, and $W$ is a $M \times L$ matrix:

$$W = \begin{bmatrix} 1 & 1 & \ldots & 1 \\ 1 & e^{-j2\pi\frac{1}{M}} & \ldots & e^{-j2\pi\frac{(M-1)}{M}} \\ \vdots & \vdots & & \vdots \\ 1 & e^{-j2\pi\frac{(M-1)}{M}} & \ldots & e^{-j2\pi(M-1)\frac{(L-1)}{M}} \end{bmatrix}. \quad (6)$$

We use the notation $X=\mathrm{diag}(\underline{X})$ to denote a $M \times M$ matrix with values $\underline{X}$ at diagonal terms of the matrix, and zeros elsewhere.

We assume there is no ISI between two successive OFDM symbols because the cyclic prefix is longer than the channel length L. Thus, we need only to consider one OFDM symbol for our analysis, and therefore omit the symbol index, and express the channel model by $$\underline{Y} = XW\underline{h} + \underline{N}. \quad (7)$$

Our EM-based method obtains an estimate of the transmitted symbol $\underline{X}$ that maximizes likelihood $p(\underline{Y}|\underline{X})$ by averaging the logarithm of a likelihood function $p(\underline{Y}, \underline{h}|\underline{X})$ over the unknown channel parameters $\underline{h}$.

The "incomplete" and "complete" symbols are $(\underline{Y})$ and $(\underline{Y}, \underline{h})$, respectively. At each iterative step $p$ ($p=0, 1, 2, \ldots$), the EM method for estimating the transmitted symbol $\underline{X}$ from the received symbol $\underline{Y}$ includes the following two steps:

E-step:

$$Q(\underline{X}|\underline{X}_p) = E\{\log p(\underline{Y}, \underline{h}|\underline{X})|\underline{Y}, \underline{X}_p\}, \text{ and} \quad (8)$$

M-step:

$$\underline{X}_{p+1} = \arg\max_{\underline{X}} Q(\underline{X}|\underline{X}_p). \quad (9)$$

During the $(p+1)^{st}$ iteration, the E-step determines the expected log likelihood function $Q(\underline{X}|\underline{X}_p)$, given $\underline{Y}$ and $\underline{X}_p$, which are the estimates obtained during the previous $p^{th}$ iteration.

During the same iteration, the M-step determines the transmitted symbol $\underline{X}_{p+1}$ that maximizes $Q(\underline{X}|\underline{X}_p)$ for the next step, given the previous estimate of the symbol $\underline{X}_p$.

Equation (8) of the E-step can be rewritten as $$Q(\underline{X}|\underline{X}_p) = \int \log p(\underline{Y}, \underline{h}|\underline{X}) p(\underline{h}|\underline{Y}, \underline{X}_p) d\underline{h}. \quad (10)$$

where the log likelihood function can be expressed as $$\log p(\underline{Y}, \underline{h}|\underline{X}) = \log p(\underline{Y}|\underline{h}, \underline{X}) + \log p(\underline{h}|\underline{X}). \quad (11)$$

The conditional pdf $p(\underline{h}|\underline{Y}, \underline{X}_p)$ used in equation (10) takes the conditional expectation over the unknown channel parameters $\underline{h}$. We assume that the CIR $\underline{h}$ and $\underline{X}$ are independent of each other. This is a reasonable assumption because, in general, the CIR does not depend on the transmitted symbol. Thus, for the purpose of maximizing equation (9), the Q function of equation (10) can be replaced by $$Q(\underline{X}|\underline{X}_p) = \int \log p(\underline{Y}, \underline{h}, \underline{X}) p(\underline{h}|\underline{Y}, \underline{X}_p) d\underline{h}. \quad (12)$$

The logarithm of the likelihood function $p(\underline{h}|\underline{Y}, \underline{X}_p)$ can be determined by $$p(\underline{h}|\underline{Y}, \underline{X}_p) = \frac{p(\underline{Y}|\underline{h}, \underline{X}_p) p(\underline{h}|\underline{X}_p)}{p(\underline{Y}|\underline{X}_p)} = \frac{p(\underline{Y}|\underline{h}, \underline{X}_p) p(\underline{h})}{p(\underline{Y}|\underline{X}_p)}, \quad (13)$$

where we use the assumption that $\underline{h}$ and $\underline{X}_p$ are independent of each other. Thus, equation (12) can be reduced to $$Q(\underline{X}|\underline{X}_p) = \int \log p(\underline{Y}, \underline{h}, \underline{X}) p(\underline{Y}|\underline{h}, \underline{X}_p) p(\underline{h}) d\underline{h}. \quad (14)$$

Because the likelihood $p(\underline{Y}|\underline{X}_p)$ does not depend on $\underline{X}$, it can be discarded in the last expression.

We now determine the exact expression of $Q(\underline{X}|\underline{X}_p)$ for a fading channel with AWGN. The conditional pdf's $p(\underline{Y}|\underline{h}, \underline{X})$ and $p(\underline{Y}|\underline{h}, \underline{X}_p)$ take the form $$p(\underline{Y}|\underline{h}, \underline{X}) = (2\pi\sigma^2)^{-M} \exp\{-\|\underline{Y} - XW\underline{h}\|^2/2\sigma^2\}, \text{ and} \quad (15)$$

$$p(\underline{Y}|\underline{h}, \underline{X}_p) = (2\pi\sigma^2)^{-M} \exp\{-\|\underline{Y} - X_p W\underline{h}\|^2/2\sigma^2\}, \quad (16)$$

where $\sigma^2$ is the variance of both the real and imaginary components of the complex-valued Gaussian noise. The pdf $p(\underline{h})$ is given by $$p(\underline{h}) = (2\pi)^{-L} \left|\det\sum\right|^{-1} \exp\left\{-\frac{1}{2}(\underline{h} - E\{\underline{h}\})^H \sum\nolimits^{-1} (\underline{h} - E\{\underline{h}\})\right\}, \quad (17)$$

where $E\{\underline{h}\}$ and $\Sigma$ are the mean and covariance matrix of the CIR $\underline{h}$.

By omitting the normalization constants, equation (12) can be expressed as $$Q(\underline{X}|\underline{X}_p) = -\int \|\underline{Y} - XW\underline{h}\|^2 p(\underline{h}|\underline{Y}, \underline{X}_p) d\underline{h}. \quad (18)$$

and $p(\underline{h}|\underline{Y}, \underline{X}_p)$ can be represented as $$p(\underline{h}|\underline{Y}, \underline{X}_p) = K \exp\left\{-\frac{1}{2}(\underline{h} - \hat{\underline{h}}_p)^H \hat{\Sigma}_p^{-1} (\underline{h} - \hat{\underline{h}}_p)\right\}, \quad (19)$$

where K is a normalized constant. The values $\hat{\underline{h}}_p$ and $\hat{\Sigma}_p$ are called the estimated posterior mean and posterior covariance matrix at the $p^{th}$ iteration, respectively.

These can be expressed as $$\hat{\underline{h}}_p = \hat{\Sigma}_p \left(W^H X_p^H \underline{Y}/\sigma^2 + \sum\nolimits^{-1} E\{\underline{h}\}\right), \text{ and} \quad (20)$$

$$\hat{\Sigma}_p = \left(W^H X_p^H X_p W/\sigma^2 + \sum\nolimits^{-1}\right)^{-1}. \quad (21)$$

Maximization of equation (18) is equivalent to minimizing a distance in an integral, i.e., $$\operatorname*{argmax}_{\underline{X}} Q(\underline{X} \mid \underline{X}_p) = \operatorname*{argmin}_{\underline{X}} E\{\|\underline{Y} - XW\underline{h}\|^2 \mid \underline{Y}, \underline{X}_p\}. \quad (22)$$

This minimization can be further simplified to $$\max_{\underline{X}} E\{\underline{h}^H F + F^H \underline{h} - \underline{h}^H G \underline{h} \mid \underline{Y}, \underline{X}_p\}, \quad (23)$$

where $$F = W^H X^H \underline{Y}, \text{ and} \quad (24)$$

$$G = W^H X^H X W. \quad (25)$$

Because the distribution of the random vector $\underline{Y}$, given $\underline{h}$ and $\underline{X}_p$, is Gaussian with a mean $\hat{\underline{h}}_p$ and covariance matrix $\hat{\Sigma}_p$, it is possible to determine $$E\{\underline{h}^H F + F^H \underline{h} \mid \underline{Y}, \underline{X}_p\} = \hat{\underline{h}}_p^H F + F^H \hat{\underline{h}}_p. \quad (26)$$

Moreover, all entries of the matrix G are given in terms of the signal energies, i.e., $\|X(0)\|^2, \ldots, \|X(M-1)\|^2$. Thus, we determine the third part of equation (19) by $$E\{\underline{h}^H G \underline{h} \mid \underline{Y}, \underline{X}_p\} = \sum_{i=1}^M C_i^2 \|X(i)\|^2, \quad (27)$$

where values of a channel update coefficients matrix $C_i^2$, $0 \leq i \leq M-1$ are real values dependent on $\hat{\underline{h}}_p$ and $\hat{\Sigma}_p$. These values are obtained according to the following equation:

$$C_i^2 = \sum_{m=0}^{M-1} \sum_{n=0}^{M-1} e^{j2\pi(m-n)\frac{i}{M}} \left( \hat{\Sigma}_p(m, n) + \hat{h}_p^*(m) \hat{h}_p(n) \right). \quad (28)$$

In order to determine $Q(\underline{X}|\underline{X}_p)$ completely, we rewrite equation (24) as follows $$F = W^H Y \underline{X}^*. \quad (29)$$

Thus, maximizing $Q(\underline{X}|\underline{X}_p)$ is the same as $$\max_{\underline{X}} \left\{ \hat{\underline{h}}_p^H W^H Y \underline{X}^* + \underline{X}^T Y W \hat{\underline{h}}_p - \sum_{i=1}^M C_i^2 \|X(i)\|^2 \right\} \quad (30)$$

Next, we maximize equation (30), in terms of the transmitted symbol $\underline{X}$, by solving $$\tilde{X}_{p+1} = \operatorname*{argmax}_{\underline{X}} Q(\underline{X} \mid \underline{X}_p) = C^{-1} \left( \hat{\underline{h}}_p^H W^H Y \right)^T, \quad (31)$$

where $C = \operatorname{diag}(C_0, \ldots, C_{M-1})$. After quantizing $\tilde{X}_{p+1}$, we obtain the next $(p+1)^{st}$ estimate $$\underline{X}_{p+1} = \operatorname{Quantization}(\tilde{X}_{p+1}). \quad (32)$$

At each iteration, the updated estimate of CIR $\hat{\underline{h}}_p$ is obtained automatically as a by-product. The next estimate of the symbol is then compared with the previous estimate of the symbol to determine if the estimates have converged. On convergence, estimation of the transmitted symbol is complete, otherwise reiterate.

General Method EM-Based Channel Estimation and Signal Detection

Figure 2:
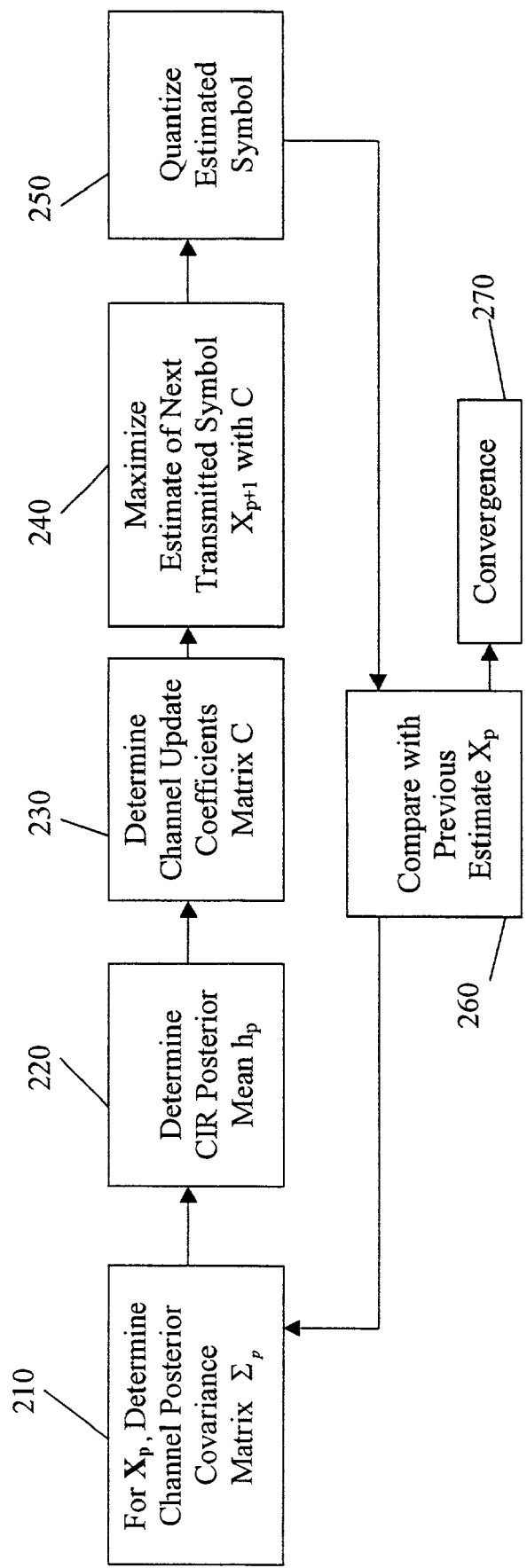
FIG. 2 is a flow diagram of a general method for detecting transmitted symbols in the system of FIG. 1.

FIG. 2 shows the general EM-based iterative signal detection method according to the invention.

For step p=0, an initial estimate of the transmitted symbol, $\underline{X}_0$, is obtained 200 for the received signal $\underline{Y}$ 201 by using the received signal Y 201 and the channel estimate 202 from a pilot symbol inserted in an OFDM frame, or from the previous estimated channel information under the assumption that the channel varies slowly.

Then for each iteration p, first determine 210 a posterior covariance matrix $\Sigma_p$ of the channel using the FFT matrix W, the previous $p^{th}$ symbol estimate $X_p$, which is $\underline{X}_0$ initially, the channel convergence matrix $\Sigma^{-1}$, and the Gaussian noise variance $\sigma^2$ as:

$$\hat{\Sigma}_p = (W^H X_p^H X_p W / \sigma^2 + \Sigma^{-1})^{-1}.$$

In step 220, determine the posterior mean $\hat{\underline{h}}_p$ of the channel impulse response $$\hat{\underline{h}}_p = \hat{\Sigma}_p (W^H X_p^H \underline{Y} / \sigma^2 + \Sigma^{-1} E\{\underline{h}\}),$$

using the received data, i.e. the observed symbol Y.

In step 230, determine the channel update coefficients matrix C for recovering estimated symbols by evaluating $$C_i^2 = \sum_{m=0}^{M-1} \sum_{n=0}^{M-1} e^{j2\pi \frac{(m-n)i}{M}} \left( \hat{\Sigma}_p(m, n) + \hat{h}_p^*(m) \hat{h}_p(n) \right).$$

Then, in step 240, determine the estimate for the $(p+1)^{st}$ iteration $\tilde{X}_{p+1}$ by applying the coefficient matrix C to the posterior mean $\hat{\underline{h}}_p$ of the CIR, the FFT matrix W, and the received symbol Y according to $$\tilde{X}_{p+1} = C^{-1} (\hat{\underline{h}}_p^H W^H Y)^T.$$

Step 250 quantizes the next estimate of the symbol according to the signal constellation $$\underline{X}_{p+1} = \operatorname{Quantization}(\tilde{X}_{p+1}).$$

In step 260, compare the next $(p+1)^{st}$ estimate $\tilde{X}_{p+1}$ with the previous $p^{st}$ estimate $\underline{X}_p$. If an absolute difference between the estimates is smaller than a predetermined threshold, $$|\underline{X}_{p+1} - \underline{X}_p| < T,$$

the estimate of the transmitted symbol has converged 270, and the iterations stop. Otherwise reiterate beginning at step 210 until $\underline{X}_{p+1} \approx \underline{X}_p$, that is, until result of the next iteration is substantially equal to the result of the previous iteration.

Simplified EM Method

Thus far, we have assumed that the length of the channel L, is known. In a real situation, however, L is generally not known. In such a case, we need to perform channel-order detection together with parameter estimation.

Alternatively, we can use some upper bound for L, which may be easier to obtain than trying to estimate an exact value of L. For the OFDM system 100, we can set L equal to the length of the cyclic prefix because, as we stated before, the cyclic prefix is at least longer than the channel delay spread in order to eliminate ISI.

In addition, the mean $E\{\underline{h}\}$ and covariance matrix $\Sigma$ of the time-domain CIR also need to be known. In the practical situation, these channel statistics are difficult to obtain.

As is known from the general convergence property of the EM method, there is no guarantee that the iterative method converges to a global maximum. For a likelihood function with multiple local maxima, the convergence point may be any one of these local maxima, depending on the initial estimated symbol $\underline{X}_0$.

Therefore, we use pilot symbols distributed at certain locations in the OFDM time-frequency lattice to obtain appropriate initial values of the CIR and $\underline{X}_0$ which are most likely to lead us to the true maximum.

So far, we have assumed that the channel statistics, i.e., the mean and covariance matrix, are known at the receiver. However, as we stated above, the channel statistics are difficult to obtain in practical situations. Fortunately, when we examine equations (26) and (27), we find that when the variance $\sigma^2$ is small, i.e., the SNR is high, the contribution of $\Sigma$ is so small that we can eliminate it and still obtain a similar performance.

Figure 3:
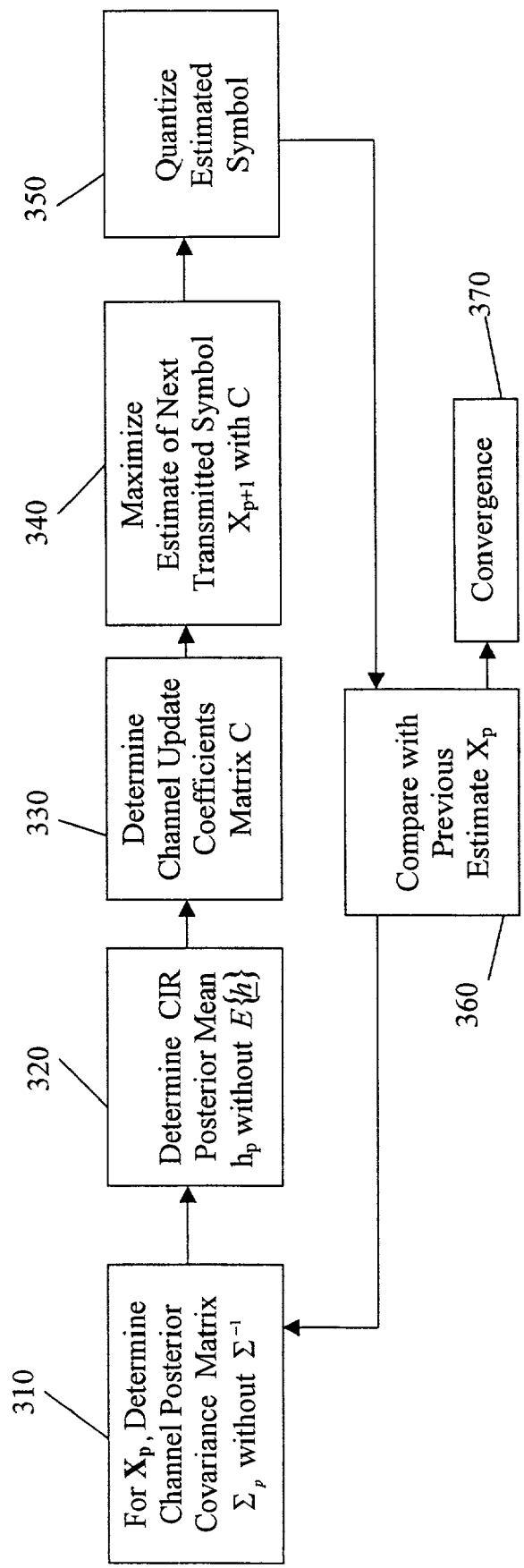
FIG. 3 is a flow diagram of a simplified method for detecting symbols in the system of FIG. 1.

Therefore, as shown in FIG. 3, we can simplify the general EM-based iterative signal detection method as follows.

As before in the initial step p=0, an initial estimate of the transmitted symbol, $\underline{X}_0$, is determined 300. The initial estimate can be obtained by using the received signal Y and the channel estimate from a pilot symbol inserted in the OFDM frame, or from the some previous estimated channel information under the assumption that the channel varies slowly.

Then for each iteration p, first determine 310 a posterior covariance matrix $\Sigma_p$ of the channel using the FFT matrix W, the previous $p^{th}$ symbol estimate $X_p$, which is $\underline{X}_0$ initially, and the Gaussian noise variance $\sigma^2$ as:

$$\hat{\Sigma}_p = (W^H X_p^H X_p W/\sigma^2)^{-1}.$$

Note that in this simplified method the channel covariance matrix $\Sigma^{-1}$ is not used.

In step 320, determine the posterior mean $\hat{\underline{h}}_p$ of the channel impulse response $$\hat{\underline{h}}_p = \hat{\Sigma}_p (W^H X_p^H \underline{Y}/\sigma^2),$$

using the received data, i.e., the observed symbol Y. Note that in the simplified method the CIR $E\{\underline{h}\}$ is also not used.

In step 330, determine the channel update coefficients matrix C for recovering estimated symbols by evaluating $$C_i^2 = \sum_{m=0}^{M-1} \sum_{n=0}^{M-1} e^{j2\pi \frac{(m-n)i}{M}} \left( \hat{\Sigma}_p(m,n) + \hat{h}_p^*(m)\hat{h}_p(n) \right).$$

Then, in step 340, determine the estimate of the transmitted symbol $\tilde{X}_{p+1}$ for the $(p+1)^{st}$ iteration by applying the coefficient matrix C to the posterior mean $\hat{\underline{h}}_p$ of the CIR, the FFT matrix W, and the received signal Y according to $$\tilde{X}_{p+1} = C^{-1}(\hat{\underline{h}}_p^H W^H \underline{Y})^T.$$

Step 350 quantizes the next estimate of the transmitted symbol according to the signal constellation $$\underline{X}_{p+1} = \text{Quantization}(\tilde{X}_{p+1}).$$

In step 360, compare the next $(p+1)^{st}$ estimate $\tilde{X}_{p+1}$ with the previous $p^{st}$ estimate $\underline{X}_p$. If an absolute difference between the estimates is smaller than a predetermined threshold, $$|\underline{X}_{p+1} - \underline{X}_p| < T,$$

the estimate of the transmitted symbol has converged 370, and the iterations stop. Otherwise reiterate beginning at step 310 until $\underline{X}_{p+1} \approx \underline{X}_p$, that is, result of the next iteration is substantially equal to the result of the previous iteration.

Basic EM-Based Method for MPSK Modulated Signal

For a MPSK modulated signal, i.e., $\|X(m)\|^2 = A$ for all m, where A is a positive constant equivalent to the signal energy, the estimation can be performed by using only phase information.

Figure 4:
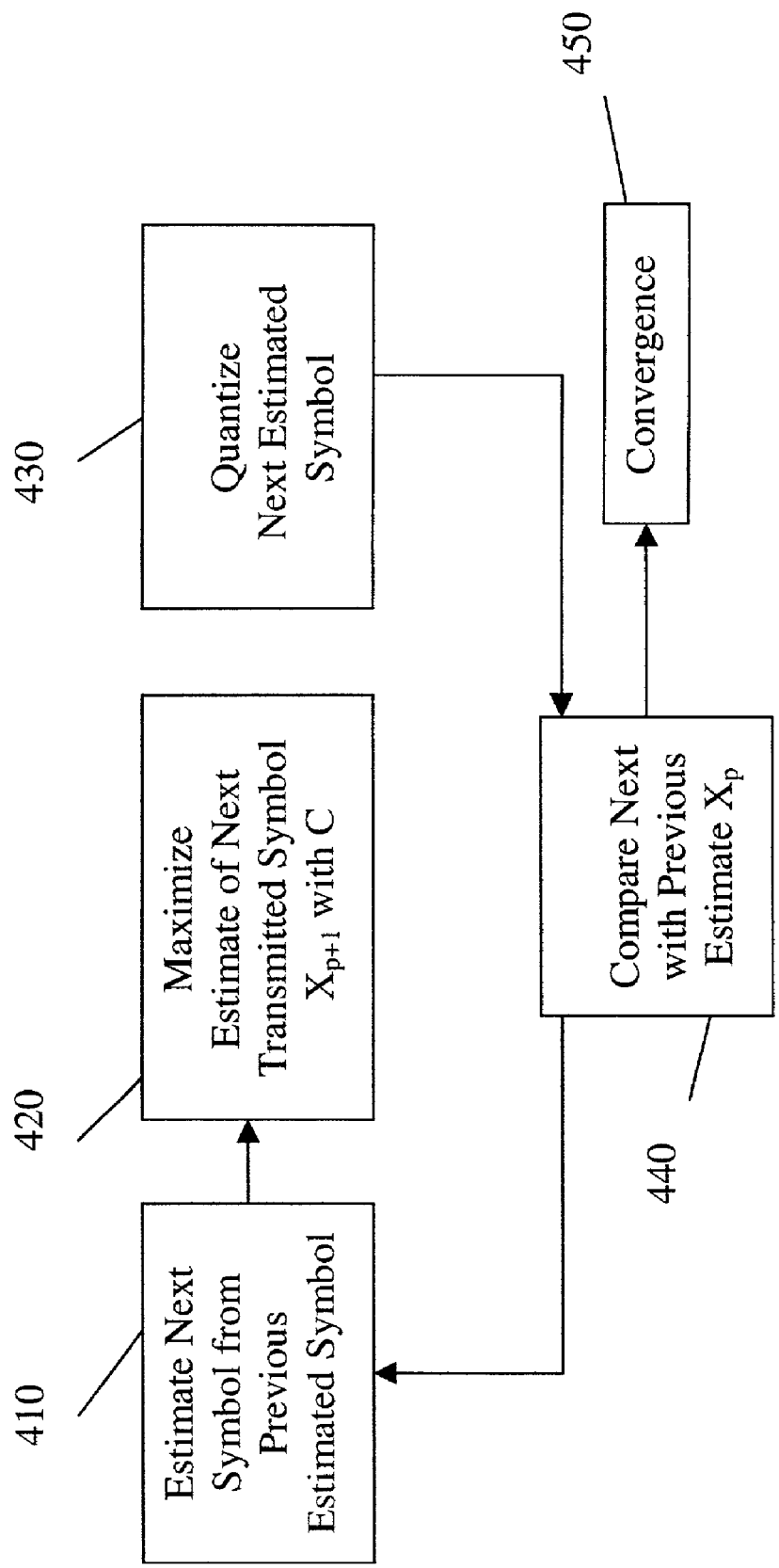
FIG. 4 is a flow diagram of a basic method for detecting symbols in a MPSK modulated system.

Thus, as shown in FIG. 4, we can further simplify the above method as follows.

As before in the initial step p=0, an initial estimate of the transmitted symbol, $\underline{X}_0$, is determined 410. The initial estimate can be obtained by using the received signal Y and the channel estimate from a pilot symbol inserted in the OFDM frame, or from the previous estimated channel information under the assumption that the channel varies slowly.

Then for each iteration p, determine the estimate for the $(p+1)^{st}$ iteration $\tilde{X}_{p+1}$ by using only the FFT matrix W, the received signal Y, and the previous $p^{th}$ symbol estimate $X_p$ according to $$\tilde{X}_{p+1} = (\underline{Y} X_p W W^H \underline{Y})^T.$$

Step 430 quantizes the next estimate of the symbol according to the signal constellation $$\underline{X}_{p+1} = \text{Quantization}(\tilde{X}_{p+1}).$$

In step 440, compare the next $(p+1)^{st}$ estimate $\tilde{X}_{p+1}$ with the previous $p^{st}$ estimate $\underline{X}_p$. If the absolute difference between the estimates is smaller than a predetermined threshold, $$|\underline{X}_{p+1} - \underline{X}_p| < T,$$

the estimate of the transmitted symbol has converged 450, and the iterations stop. Otherwise reiterate beginning at step 410 until $\underline{X}_{p+1} \approx \underline{X}_p$, that is, result of the next iteration is substantially equal to the result of the previous iteration.

In this basic form, we need only to perform addition and multiplication operations, and $WW^H$ can be determined ahead of time.

Effect of the Invention

We can construct an OFDM model system to demonstrate the validity and effectiveness of the EM-based signal estimation method according to the invention. The entire channel bandwidth of 400 kHz is divided into 64 subcarriers.

The symbol duration of each orthogonal subcarrier is 160 µs. An additional 20 µs cyclic prefix added to provide protection from ISI and ICI due to channel delay spread. Thus, the total OFDM frame length is $T_s = 180$ µs, and the subcarrier symbol rate is 5.56 kilobaud.

In this model of the system, the modulation scheme is QPSK. One OFDM frame out of eight OFDM frames includes pilot symbols, and eight pilot symbols are inserted into such a frame. The system can transmit data at 700 kbits per second. The maximum Doppler frequencies are 55.6 Hz and 277.8 Hz, which make $f_d T_s$ 0.01 and 0.05, respectively. The channel impulse response is $$h(n) = \frac{1}{C} \sum_{k=0}^{7} e^{-\frac{k}{2}} \alpha_k \delta(n-k), \quad (33)$$

where $$C = \sqrt{\sum_{k=0}^{7} e^{-k}}$$

is a normalization constant and $\alpha_k$, $0 \leq k \leq 7$ are independent complex-valued Rayleigh distributed random variables with unit energy, which vary in time according to the Doppler frequency. This is a conventional exponential decay multipath channel model.

Figure 5:
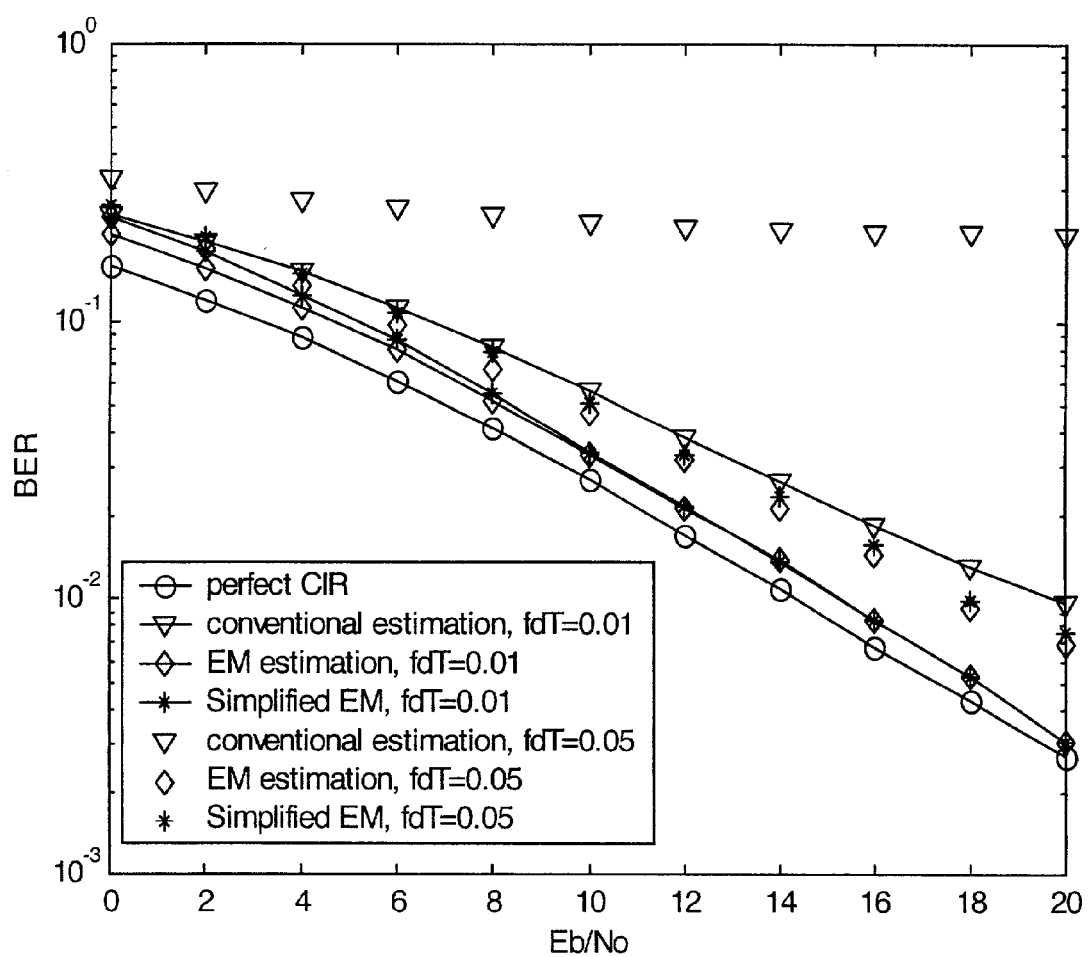
FIG. 5 is a graph comparing bit error rates for different channel estimation methods as a function of SNR.
Figure 6:
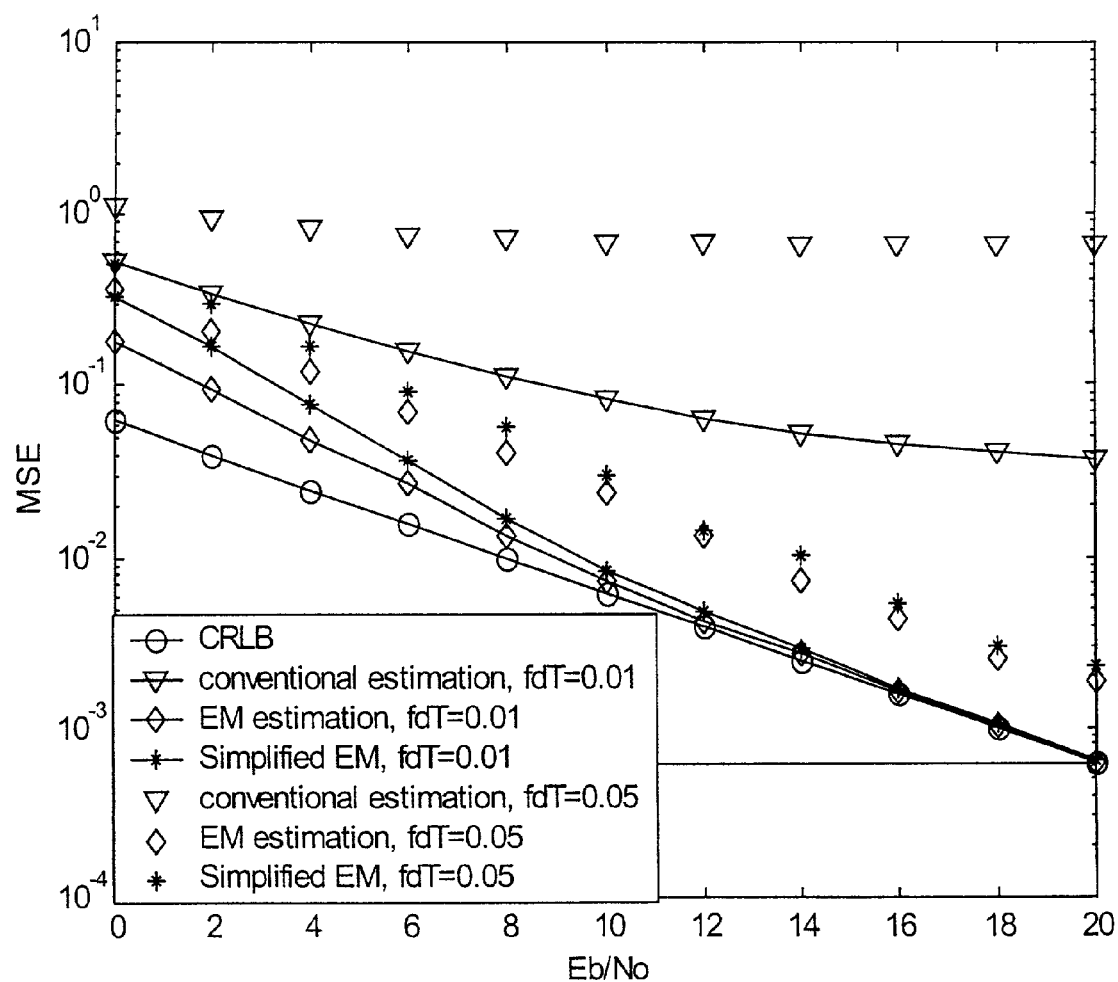
FIG. 6 is a graph comparing mean square error for different channel estimation methods as a function of SNR.

FIG. 5 shows the BER performance of EM-based OFDM signal estimation method with the above two different Doppler frequencies, and FIG. 6 shows the corresponding MSE (Mean Square Error) of the estimate. In both graphs the performance is shown as a function of the SNR $E_b/N_0$.

In prior art channel estimation methods, for those OFDM frames containing pilot symbols; the estimate of CIR is obtained by using these eight equally spaced pilot symbols. For those OFDM frames without pilot symbols, the conventional estimation of CIR comes from the channel estimate of the previous OFDM frame.

In the EM-based method according to the invention, the channel estimate of the previous symbol is used for obtaining the initial value for the next symbol when there are no pilot symbols in the frame.

From FIGS. 5 and 6, it can be seen that our EM-based method achieves substantially the same performance as the ideal case in terms of BER, where the if channel characteristics are completely known when $f_d T_s = 0.01$, i.e., the channel characteristics do not change very fast. Furthermore, the MSE of our EM-based method converges to the Cramer-Rao Lower Bound (CRLB) when $E_b/N_0$ becomes large.

The performance gain from the initial estimate is considerably large, especially when $f_d T_s = 0.05$. In addition, the performance degradation is substantially small when we use the simplified EM-based method that does not use the channel statistics. Thus, our method is robust.

Figure 7:
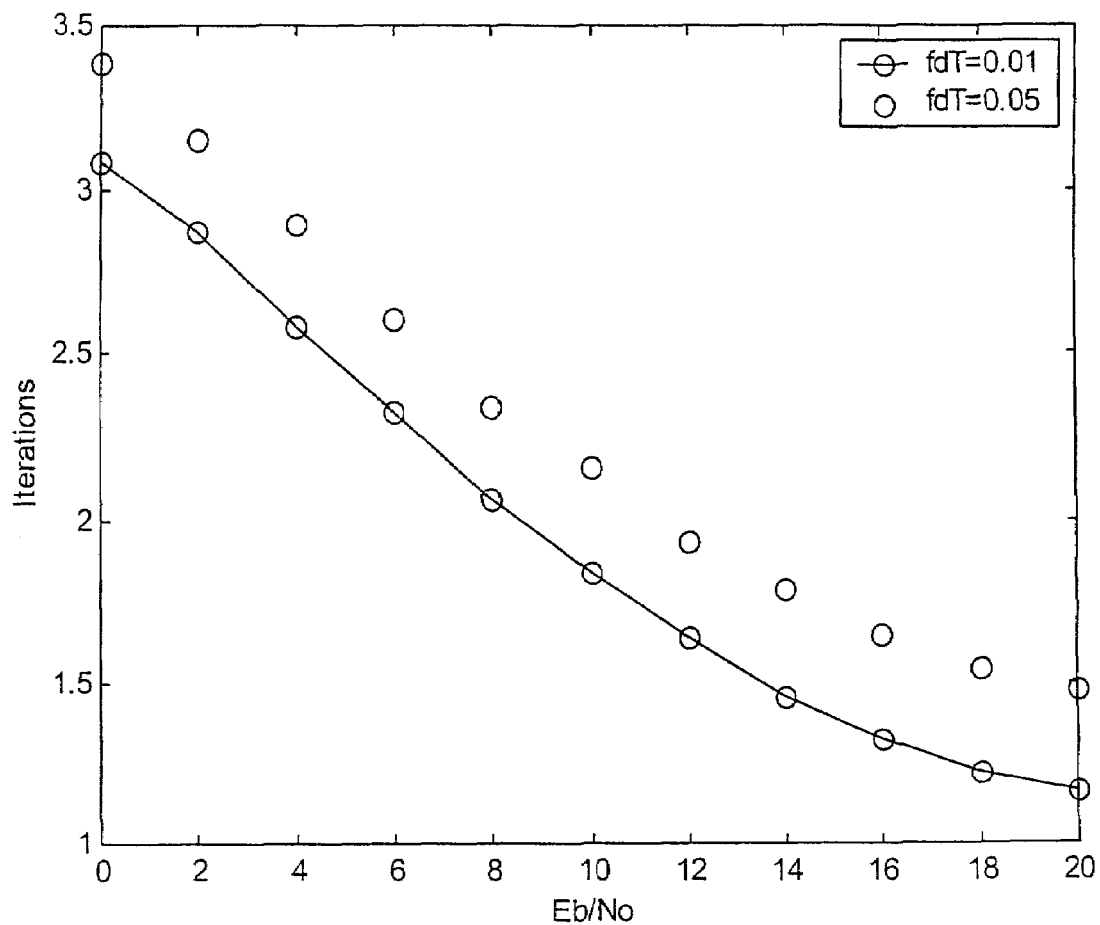
FIG. 7 is a graph comparing iterations for signal detection as a function of SNR.

In FIG. 7, we show the number of iterations required for the estimates $\underline{X}_p$ to converge versus $E_b/N_0$ at the receiver input. We see that the number of necessary iterations is relatively small in a broad range of $E_b/N_0$, whether the channel varies slowly, or not at all. Fast channel variation causes only a very small increase in the number of iterations required to converge. This demonstrates that our method can achieve a substantial performance improvement with only a modest increase in the computational complexity.

We have described a novel EM-based channel estimation and signal detection method, its simplified form for OFDM systems, and a basic form for MPSK systems. The method is efficient because the number of iterations needed to converge is small, e.g., three or less, and the complexity of the operations required in each iteration is low. By making use of pilot symbols to obtain the initial estimate, the method can achieve a near-optimal estimate after a small number of iterations when the channel changes slowly. The MSE of the channel estimation approaches CRLB when $E_b/N_0 \geq 10$ dB.

The method according to the invention can reduce the number of pilot symbols inserted in the time-frequency grid of an OFDM system over slow time variation channels. Thus, the spectral efficiency is improved. The corresponding simplified method does not need any knowledge of the channel statistics without degrading performance.

The method according to the invention can also improve channel estimation accuracy obtained from any other method by iterative steps using that channel estimate as the initial estimate. Our method can also be used to estimate the channels in multi-input/multi-output (MIMO) OFDM systems.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for detecting symbols of a modulated signal received via channels of a wireless communications system, comprising:

obtaining an initial estimate of a transmitted symbol via the channels from a previous channel estimate and a received symbol;

updating the channel estimate;

optimizing a next estimate of the transmitted symbol which maximizes an expectation of a log likelihood function by averaging a logarithm of a likelihood function over unknown parameters $\underline{h}$ of the channels;

quantizing the next estimate of the transmitted symbol;

comparing the quantized next estimate of the transmitted symbol with the initial estimate of the transmitted symbol to determine if the initial estimate of the transmitted symbol and the quantized next estimate of the transmitted symbol have converged; and otherwise inputting the quantized next estimate of the transmitted symbol as the initial estimate of the transmitted symbol; and repeating the updating, the optimizing, the quantizing, and the comparing until the initial estimate of the transmitted symbol and the quantized next estimate of the transmitted symbol converge; and further comprising:

determining a posterior covariance matrix $\hat{\Sigma}_p$ of the channels using a FFT matrix W, the initial estimate of the transmitted symbol $X_p$, the received symbol Y, and a Gaussian noise variance $\sigma^2$ as $$\hat{\Sigma}_p = (W^H X_p^H X_p W/\sigma^2)^{-1};$$

determining a posterior mean $\hat{\underline{h}}_p$ of a channel impulse response as $$\hat{\underline{h}}_p = \hat{\Sigma}_p (W^H X_p^H Y/\sigma^2);$$

determining a channel update coefficients matrix C for recovering the next estimate of the transmitted symbol; and applying the coefficient matrix C to the posterior mean $\hat{\underline{h}}_p$, the FFT matrix W, and the received symbol Y according to $\hat{X}_{p+1} = C^{-1}(\hat{\underline{h}}_p^H W^H Y)^T$ to optimize the next estimate of the transmitted symbol $X_{p+1}$.

2. The method of claim 1 wherein the modulated signal is a multiple phase shift keying (MPSK) modulated signal having a positive constant equivalent to an energy of the modulated signal, and using only phase information during the updating.

3. The method of claim 1 wherein the comparing further comprises:

subtracting the initial estimate of the transmitted symbol from the quantized next estimate of the transmitted symbol to obtain a difference; and determining that the initial estimate and the quantized next estimate have converged when an absolute value of the difference is less than a predetermined threshold.

4. The method of claim 1 further comprising:
obtaining the initial estimate of the transmitted symbol from the channel estimate of a pilot symbol received via the channels.

5. The method of claim 1 further comprising:
obtaining the initial estimate of the transmitted symbol from the channel estimate of a previously received symbol.

6. The method of claim 1 wherein the optimizing further comprises:
using only a fast Fourier transform matrix, the received symbol, and the previous channel estimate.

7. The method of claim 1 wherein the next estimate of the transmitted symbol is quantized according to a constellation of the received signal.

8. The method of claim 1 where determining a posterior means comprises determining the posterior mean $\hat{h}_p$ of a channel impulse response as $\hat{h}_p = \hat{\Sigma}_p(W^H X_p^H Y/\sigma^2 + \Sigma^{-1} E\{h\})$, where the receiver symbol is Y, and $E\{h\}$ is the channel impulse response.

9. The method of claim 1, wherein the modulated signal received was modulated using orthogonal frequency division multiplexing.

10. A system for detecting symbols of a modulated signal received via a plurality of channel of a wireless communications system, comprising:
means for obtaining an initial estimate of a transmitted symbol via the channels;
means for updating the channel estimate;
means for optimizing a next estimate of the transmitted symbol which maximizes an expectation of a log likelihood function by averaging a logarithm of a likelihood function over unknown parameters $h$ of the channels;
means for quantizing the next estimate of the transmitted symbol;
means for comparing the quantized next estimate of the transmitted symbol with the previous estimate of the transmitted symbol to determine if the initial estimate and the quantized next estimate have converged; and otherwise
means for making the quantized next estimate of the transmitted symbol an input for a next iteration; and means for repeating the updating, the optimizing, the quantizing, and comparing until the initial estimate of the transmitted symbol and the quantized next estimate of the transmitted symbol converge; and further comprising:
means for determining a posterior covariance matrix $\hat{\Sigma}_p$ of the channels using a FFT matrix W, the initial estimate of the transmitted symbol $X_p$, the received symbol Y, and a Gaussian noise variance $\sigma^2$ as $$\hat{\Sigma}_p = (W^H X_p^H W/\sigma^2)^{-1};$$

means for determining a posterior mean $\hat{h}_p$ of the channel impulse response as $\hat{h}_p = \hat{\Sigma}_p(W^H X_p^H Y/\sigma^2)$;
means for determining a channel update coefficients matrix C for recovering the next estimate of the transmitted symbol; and
means for applying the coefficient matrix C to the posterior mean $\hat{h}_p$, the FFT matrix W, and the received symbol Y according to $\tilde{X}_{p+1} = C^{-1}(\hat{h}_p^H W^H Y)^T$ to maximize the next estimate of the symbol $\tilde{X}_{p+1}$.

11. The system of claim 10 wherein the modulated signal is a multiple phase shift keying modulated signal having a positive constant equivalent to an energy of the modulated signal, and using only phase information during the updating.

12. The system of claim 10 further comprising:
means for subtracting the initial estimate of the transmitted symbol from the quantized next estimate of the transmitted symbol to obtain a difference; and
means for determining that the initial estimate and the next estimate have converged when an absolute value of the difference is less than a predetermined threshold.

13. The system of claim 10 wherein the initial estimate of the transmitted symbol is obtained from a pilot symbol received via the channels.

14. The system of claim 10 wherein the initial estimate of the transmitted symbol is obtained from a channel estimate from a previously received symbol.

15. The system of claim 10 where the means for determining a posterior mean comprises means for determining the posterior mean $\hat{h}_p$ of a channel impulse response as $\hat{h}_p = \hat{\Sigma}_p(W^H X_p^H Y/\sigma^2 + \Sigma^{-1} E\{h\})$ where the received symbol is Y and $E\{h\}$ is the channel impulse response.

16. The system of claim 10 wherein the modulated signal received was modulated using orthogonal frequency division multiplexing.

* * * * *